Patented Oct. 11, 1927.

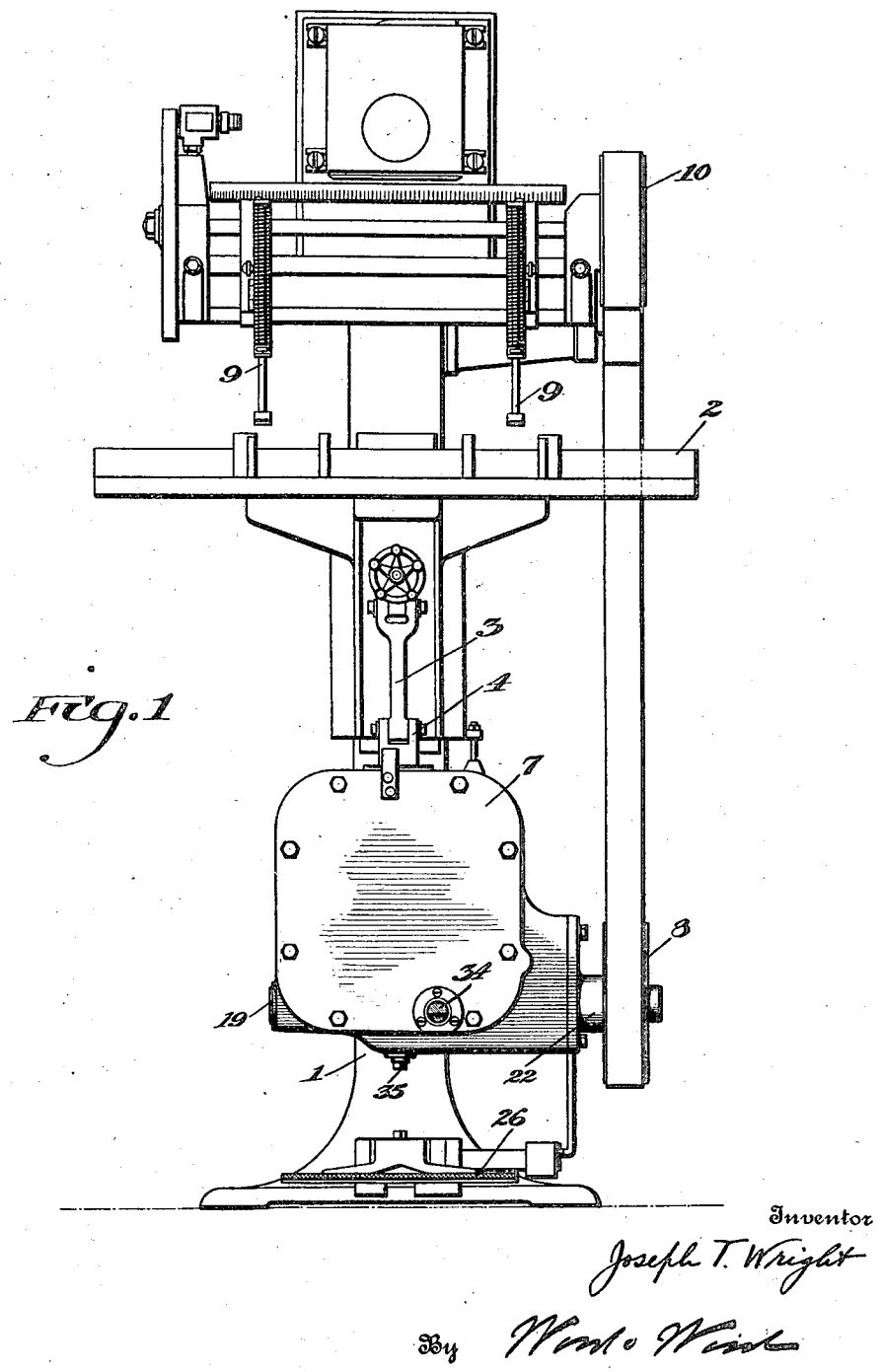

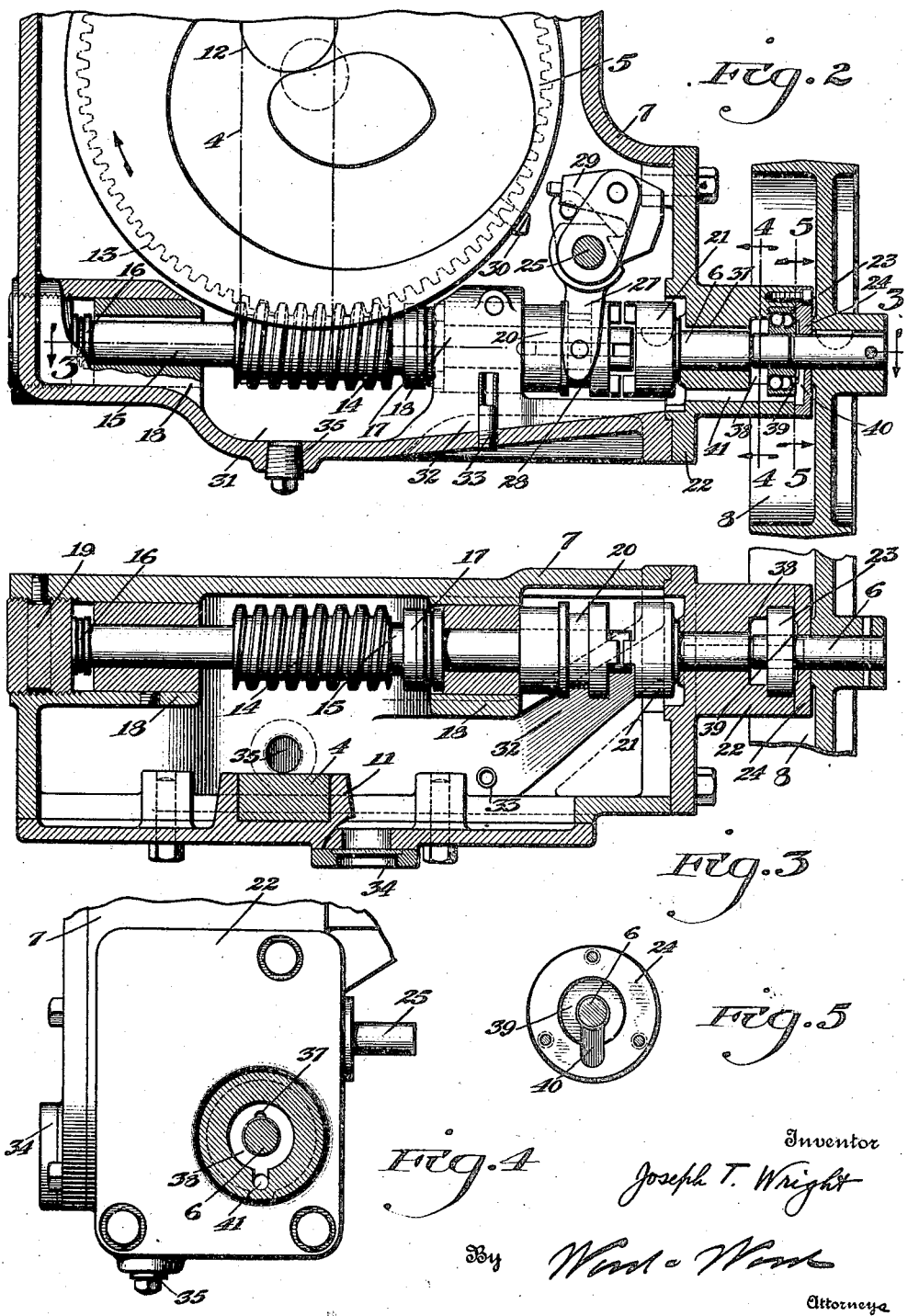

1,645,504

UNITED STATES PATENT OFFICE.

JOSEPH T. WRIGHT, OF CINCINNATI, OHIO, ASSIGNOR TO THE J. T. WRIGHT COMPANY, OF CINCINNATI, OHIO, A CORPORATION OF OHIO.

LUBRICANT CONTROL FOR TRANSMISSION.

Application filed October 8, 1925. Serial No. 61,367.

This invention relates to transmission lubrication of the enclosed casing and splash system type and particularly to the control of the liquid lubricant at locations where revolving elements of the transmission extend through the casing to the exterior establishing openings through which the lubricant will readily drain or leak and induced by the centrifugal action, especially when in range or proximity of the lubricant supply and collecting reservoir, unless control thereof is provided.

An object of the invention is to provide such exteriorly extending revolving element with a rotor operating in relation to a duct or channel for forcibly controlling and conveying the lubricant in a direction toward a collecting reservoir and prevent the establishing of an overflow accumulation in a drainage course from the reservoir. In the present instance due to the character of transmission it is possible to utilize certain parts thereof as a toothed clutch element to serve as a rotor.

Another object of the invention is to provide a method of lubrication for a machine or transmission wherein the channel or ducts for lubricant circulation are provided in relation to a rotating member as an element of the transmission and utilized in the capacity of a pump for withdrawing a surplus or accumulated amount of lubricant from a bearing or part to be lubricated to which the lubricant is fed by gravity.

Other objects and certain advantages will be more fully set forth in the description of the accompanying drawings forming a part of this specification and in said drawings, in which:

Figure 1 is a general view of a paper drilling machine incorporating the improved lubricating system in the transmission casing.

Figure 2 is an enlarged sectional view of the lower portion of the transmission casing.

Figure 3 is a sectional view taken on line 3—3, Figure 2, showing the relation of the oil channel and rotating elements.

Figure 4 is a sectional view taken on line 4—4, Figure 2, detailing the shaft end bearing.

Figure 5 is a sectional view taken on line 5—5, Figure 2, detailing the bearing cap.

This oiling system while shown incorporated within a particular type of transmission casing may be applied to various types wherein a shaft leads to the exterior of the casing at a comparatively low elevation thereof.

Referring to Figure 1 of the drawing, 1 indicates the pedestal of a drilling machine and 2 the reciprocating table, slidably mounted on the pedestal and reciprocated by means of a link 3 connecting the table and the pitman 4, the pitman in turn reciprocated by the cam wheel 5 and the cam wheel 5 rotated by means of a shaft 6. The pitman 4, cam 5, and shaft 6 are mounted within a transmission casing 7 at the base of the drilling machine, the shaft 6 extending through the casing and having a pulley 8 on its outer end driven by a belt, connecting with the power source on the back of the machine. The belt also actuates the drilling units 9, mounted on the pedestal above the table, by means of the pulley 10.

The mechanism mounted within the casing 7 for controlling the reciprocation of the table which will be hereafter described in detail to aid in disclosing the present invention is fully described and claimed in copending application Serial No. 44,704.

Referring to the detailed views (Figures 2 and 3) of the drawings, the pitman 4 is guided for reciprocation in the guideway 11 in the cover plate of the casing and has the roller 12 secured thereto, the roller 12 engaging the cam groove of the cam wheel 5. The cam wheel has the gear 13 secured thereto meshing with a worm gear 14 provided on a shaft 15 extending below the cam wheel and at right angles to the axis of the cam wheel.

The shaft 15 is journaled in ball bearings 16, 17, mounted in lugs in the base of the casing 7, the shaft also journaled in plain bearings set within the lugs 18, the ball bearings 16, 17, adaptable as end thrust bearings, end play being taken up by means of an adjusting screw 19 located at one end of the shaft. The shaft 15 ends within the casing and has the toothed clutch member 20 slidably keyed at its end for clutching engagement with a complementary clutch member 21 rigidly keyed to the end of the shaft 6 axially aligned with the shaft 15.

The shaft 6 having the pulley 8 secured to its outer end is mounted within a bearing bracket 22 bolted to the casing. The outer end of the shaft 6 is mounted in a ball bearing 23 held within a circumferential groove in the outer face of the bearing bracket by means of a bearing cap 24 secured to the face of the bracket by means of screws, the inner end of the shaft being journaled within the body of the bearing bracket.

The clutch shifting means are mounted on a rock shaft 25 connecting with the foot treadle 26 of the machine, the rock shaft being journaled in the walls of the casing above the shaft 15 and at right angle thereto. The shifting means consists of a clutch shifting member 27 mounted on the shaft 25 and extending downward. On the lower end of the clutch shifting member is mounted a yoke 28 engaging into a circumferential groove in the clutch member 20 for sliding the clutch member 20 into clutching engagement with the companion clutch member 21. Automatic tripping mechanism 29 is also embodied as a part of the clutch shifting means for operation in conjunction with a stud 30 mounted on the cam wheel the description of this mechanism forming the subject matter of the before mentioned copending application Serial No. 44,704.

That section of the base of the casing between the lugs 18 is of greater depth than the remainder, and forms a basin or oil reservoir 31 for the system. An oil channel 32 extends obliquely of the shaft 15 to the reservoir 31 from a point directly beneath the clutch members 20, 21, (see Figure 2). The oil level in the reservoir is limited by the overflow pipe 33 and determined by means of a gauge 34 on the cover plate of the casing, a drain plug 35 being provided in the base of the reservoir for draining the system.

The normal oil level is at a point slightly below the shaft 15 and shaft 6 so that there can be no leakage through the shaft aperture in the bearing cap 24 when the mechanism is not in motion. An oil groove 37 is provided in the upper surface of the bore of the bearing bracket at that point where the shaft 6 is journaled therein, this groove connecting the interior of the casing with a circumferential recess 38 behind the ball bearing 23 as an oil supply duct to the ball bearing. The bearing cap 24 has a slight circumferential recess 39 in its rear side and a slot 40 of greater depth than the groove extending from the lower portion of the shaft 15 to a point below the ball bearing.

An oil duct 41 as a return passage for the oil in the lower portion of the bearing bracket connects the slot 40 and the recess 38 to the interior of the casing at a point directly at the head of the channel 32.

As the clutch is thrown in and the shaft 15 rotated, the various elements mounted thereon, being partly submerged in oil throw the oil about the casing, the cam wheel 5 and the gear 13 carrying oil to the upper mechanism. A certain amount of splashed oil enters the bearing bracket 22 through the groove 37 and along the bearing of shaft 6 into the recesses 38, 39, for oiling the bearings of the shaft 6. This oil is rapidly drawn out of the bearing bracket through the slot 40 and oil duct 41 since the oil at the head of the channel 32 is returned to the reservoir by the centrifugal action of the rotating clutch members, as rotors, this action tending to draw the oil through the oil duct 41 into the channel. The rotation of the clutch members is clockwise as viewed from the pulley end of the shaft, in which direction the oil is thrown obliquely against the side 42 of the channel, and directed to the reservoir, the channel sloping slightly toward the reservoir to direct the oil toward the same.

It can readily be seen that the same circulation is produced when the clutch is thrown out, the clutch member 21 on the shaft 6 merely acting alone. Due to the oil being rapidly drawn from the bearing bracket there can be no increase in oil level in the bearing bracket to a point above the shaft aperture in the bearing cap.

In utilizing the toothed clutch element, which is a part of the transmission, as a rotor placed in proximity to the channel or duct 41 any surplus or accumulating amount of lubricant is drawn from the bearing and forced into the reservoir, preventing a leakage through the bearing, while the machine is running so that the result is obtained without any added cost to the machine. Utilizing the splash system for lubricant distribution, the lubricant is conveyed upwardly by the gearing in an excessive quantity so that a considerable quantity will drain into the oil ducts and channels of the journal 22 in excess of what would be required for lubricating the shaft 6 in said bearing and ball bearing 23 which readily drain along the shaft to the exterior of the casing and which is induced by the centrifugal action of the machine element, and which if permitted to continue exhausts the lubricant supply for the casing. With the method herein employed use of packing is eliminated.

Due to the character of transmission disclosed, the driving shaft extends through the casing at an elevation close to the base of the casing and also to the normal liquid lubricant level of a comparatively shallow reservoir presenting an extreme condition, and at which the improvement has been very efficient. The principle can be equally applied at any bearing through which a shaft extends exteriorly of the casing and when utilized at an elevation at which the channel 32 is above the oil level the lead thereof may be considerably reduced, and any other form of rotor employed which may not also function as a clutch, so that the rotor may be treated as not a part of the transmission.

Having described my invention, I claim:

1. In a casing enclosed transmission, a casing, a shaft of the transmission journalled in a bearing, the bearing being component of the casing for extending the shaft through the casing, ducts in said bearing for distributing a liquid lubricant to said shaft, a channel within the casing below the shaft leading obliquely from said ducts, and a clutch member on said shaft rotating therewith and adjacent the inner side of said bearing and rotating in relation to said channel for effecting centrifugal action for forcibly withdrawing any excess lubricant within the bearing ducts and directing the same into the casing during the rotation of said shaft, thereby preventing any leakage of oil through said bearing.

2. In a casing enclosed transmission, a casing, a shaft of the transmission journaled in a bearing as a component of the casing for extending the shaft through the casing, ducts for distributing a liquid lubricant to the bearing, a channel extending inwardly from the bearing in communication with said ducts at a drainage elevation, and a clutch interior of the casing for said shaft adjacent the inner side of said bearing and rotating in relation to said channel for effecting centrifugal action for forcibly withdrawing any excess lubricant within the bearing ducts and directing the same into the casing during the rotation of said shaft, thereby preventing any leakage of oil through said bearing.

In witness whereof, I hereunto subscribe my name.

JOSEPH T. WRIGHT.